United States Patent Office 3,654,168
Patented Apr. 4, 1972

3,654,168
DETERGENT COMPOSITION CONTAINING
AMORPHOUS SODIUM SILICATE, AND
METHOD OF WASHING FABRIC
Conrad J. Gaiser, 24 66th Place,
Long Beach, Calif. 90803
No Drawing. Continuation-in-part of application Ser. No. 815,990, Apr. 14, 1969, which is a continuation-in-part of application Ser. No. 654,230, July 18, 1967, now Patent No. 3,450,494, dated June 17, 1969. This application July 28, 1969, Ser. No. 845,531
The portion of the term of the patent subsequent to June 17, 1986, has been disclaimed
Int. Cl. C11d 3/08, 3/30, 7/14
U.S. Cl. 252—135                3 Claims

ABSTRACT OF THE DISCLOSURE

A detergent composition comprises amorphous sodium silicate having a burr-like particle structure which provides a highly colloidal dispersion in water for effective soil suspension, thus precluding pollution of the water effluent by phosphate heretofore employed for such purpose. A water softening chelating agent, and a surfactant to loosen soil from fabric are included in the composition.

REFERENCE TO COPENDING APPLICATION

The instant application is a continuation-in-part of applicant's copending application, er. No. 815,990, filed Apr. 14, 1969, for "Detergent Tablet of Amorphous Sodium Silicate Having Inherent Binding Properties, Containing a Surfactant, and Method of Making Such Tablet," which is a continuation-in-part of application, Ser. No. 654,230, filed July 18, 1967, (now Pat. 3,450,494, dated June 17, 1969) for "Amorphous Sodium Silicate Having Inherent Binding Properties and Method of Producing Same" which in turn was a continuation-in-part of applicant's now abandoned parent application Ser. No. 352,142, filed Mar. 16, 1964.

BACKGROUND OF THE INVENTION

Laundry detergent compositions for the cleaning of fabric or the like generally contain so-called glassy polyphosphates, such as tetrasodium pyrophosphate (TSPP) or sodium tripolyphosphate (STPP), a suitable surfactant, and sometimes a crystalline sodium silicate such as sodium metasilicate; the glassy polyphosphate being in a major proportion of about 60–70% by weight of these ingredients, and the crystalline sodium silicate about 5 to 12% by weight. The polyphosphate serves the dual purpose of sequestering calcium and magnesium ions (water softening) found in hard water and thus prevent them from forming insoluble soaps with fats in the soil being removed from the wash load, also of preventing soil loosened from the material being washed from reprecipitating on the fabric by maintaining the soil in suspension.

Although the polyphosphates are effective in performing these two functions, they have the objection of polluting the wash water effluent with phosphate which promotes growth of algae and other water plants in the body of water into which the effluent is ultimately discharged, thus depleting the water oxygen which is undesirable for general flora and fauna. Furthermore, the polyphosphate is relatively expensive, making the composition containing the same relatively expensive.

SUMMARY AND OBJECTS OF THE INVENTION

Summarizing the invention hereof, a special form of amorphous sodium silicate of the character disclosed in applicant's aforementioned U.S. Pat. 3,450,494 is substituted for the polyphosphate in a detergent composition of the aforementioned type. Because of its special physical properties, such amorphous sodium silicate forms a highly colloidal dispersion in water to provide effective soil suspension, and thus prevents redeposit of the soil onto the material being washed. Effective soil suspension is not obtainable with heretofore conventional forms of crystalline sodium silicate. The composition also contains any suitable type of chelating agent for sequestering calcium and magnesium ions to thus soften hard water, and any suitable surfactant, as in prior polyphosphate compositions, which enhances freeing or loosening of soil from fabric or other material being washed.

Thus a composition is provided which in the process of washing results in an effluent free of phosphate pollutant. Even though a chelating agent is added, the composition is less expensive than a polyphosphate-containing composition.

From the preceding, it is seen that the invention has as its objects, among others, the provision of an improved detergent composition substantially free of phosphate, which is relatively inexpensive, and a method of washing fabric in an aqueous medium while precluding a water effluent containing phosphate pollutant. Other objects of the invention will become apparent from the following more detailed description.

DETAILED DESCRIPTION

As described in applicant's aforementioned Pat. 3,450,494, amorphous sodium silicate made in accordance with the method of the patent, has a burr-like spongy structure with non-glazed surfaces, in contradistinction to crystalline sodium silicates, and are of fine particles which form a highly colloidal dispersion in an aqueous medium to provide effective soil suspension. The bulk density of such amorphous particles, namely the density of a mass of particles as formed, is usually in the range of 8 to 35 lbs. per cubic foot. The particle size generally ranges from 5 to 150 mesh, and more usually from 10–20 mesh.

Because of the highly colloidal solution which the amorphous silicate hereof forms, a very great surface area, negatively charged, is provided upon which soil removed from fabric or other material being washed, will affix and be carried away while regular crystalline sodium silicates form dispersions in which the particles are so large that insufficient surface is available for effective soil adsorption. Also, because of the burr-like particles, the amorphous sodium silicate has inherent binding properties rendering a mass containing such particles self-binding under compression. Consequently, the particles may be compressed readily into tablets without the employment of extraneous binders.

A desirable range of proportions for the composition in percent by weight is as follows:

|  | Percent |
|---|---|
| Amorphous sodium silicate | 50–80 |
| Chelating agent | 5–25 |
| Surfactant | 5–15 |

In addition, the composition may contain as nonessential ingredients, a minor amount of a gum-type secondary soil suspending agent, such as carboxy methyl cellulose, in an amount of 0–2% by weight, an optical brightening agent, 0 to 0.02%, and perfume or masking agent 0 to 0.75%. The latter three nonessential agents are conventionally employed in detergent compositions.

The same amounts are added to the wash water as usually employed for polyphosphate-containing compositions. For example, the average household laundry load of fabric in a normal size washing machine is about 8 lbs. and the amount of wash water is about 6 gallons for the 8 lbs. A suitable amount of composition which may be added to the water is about 2 to 6 ounces for such load but this is not critical. The amount is adjusted proportionally with increase in load of material and consequent increase in the amount of water.

Any suitable surfactant may be employed which enhances loosening of the soil from the material being washed, such a as alkyl aryl sulfonate, nonylphenol to which 9.5 mols of ethylene oxide are added, sodium salt of dodecyl benzene sulfonate, sodium polypropylene benzene sulfonate, linear alkyl sulfonate-sodium salt, alkyl aryl polyethylene glycol ether, sodium lauryl sulfate, ethoxylated linear alcohols, and ethoxylated alkyl phenols. With respect to the chelating agents tetra sodium ethylene diamine tetra acetic acid (EDTA) and nitrilotriacetic acid are most suitable but other sequestering agents for calcium and magnesium may be employed to soften the water.

Also, the composition may contain the usual conventional brightening and perfume agents, and secondary soil suspending agent. The composition may be used in solid granular form and introduced into the wash water, or it may be compressed into solid tablets and used as such. The inherent binding properties of the amorphous sodium silicate hereof acts as the binding agent for the tablets without the necessity of utilizing an extraneous binding agent.

The following are examples of typical formulations in percent by weight:

EXAMPLE I

| | Percent |
|---|---|
| Amorphous sodium silicate ($Na_2O$ to $SiO_2$ ratio of 1.0 to 2.6; 25% water by weight) | 70.5 |
| Surfactant (nonylphenol to which 9.5 mols ethylene oxide are added—Plurafac A-38 by Wyandotte Chemical Corp.) | 12.0 |
| Chelating agent (nitrilotriacetic acid—NTA 150 by Hampshire Chemical Co.) | 16.0 |
| Carboxy methylcellulose (Carbose B-26 by Wyandotte Chemical Corp.) [1] | 1.0 |
| Optical brightener (Blancophor DS) [1] | 0.01 |
| Perfume (Florosynth Lab's Honeysuckle 90) [1] | 0.49 |

[1] Optional.

The above composition is suitable for use in granular form.

EXAMPLE II

| | Percent |
|---|---|
| Amorphous sodium silicate ($Na_2O$ to $SiO_2$ ratio of 1.0 to 2.6; 25% water by weight) | 73.0 |
| Chelating agent (tetra sodium ethylene diamine tetracetic acid Hampshire-100 by Hampshire Chemical Corp.) | 9.0 |
| Surfactant (nonylphenol to which 9.5 mols ethylene oxide are added—Plurafac A-38 by Wyandotte Chemical Corp.) | 12.0 |
| Carboxy methyl cellulose (Carbose D by Wyandotte Chemical Co.) [1] | 2.0 |
| Optical brightener (Blancophor DS) [1] | 0.01 |
| Perfume (Florosynth Lab's Honeysuckle 90) [1] | 0.49 |

[1] Optional.

This mixture is compressed into tablets of about 60 grams each, then dipped into molten alkyl aryl polyethylene glycol ether, a surfactant (Surfonic N-150 by Jefferson Chemical Co.). The dipping is sufficiently long to take up 3.5% surfactant by weight of the total composition, making a total amount of surfactant of about 12.5% by weight. When solidified, the waxy surface coating of such surfactant provides protection for the amorphous sodium silicate against reaction with carbon dioxide in the air. The tablet is suitable for an approximate 8 lb. load of fabric in a household washing machine.

I claim:

1. A detergent composition in granular form substantially free of pyrophosphate and polyphosphate sequestering and soil suspending agents and consisting essentially as active components of (A) non-crystalline, amorphous, burr-like, spongy sodium silicate particles having a bulk density of about 8 to 35 lbs. per cubic foot, and having the property of forming a highly colloidal dispersion in water to provide effective soil suspension; said silicate particles being obtained by heating under a pressure of at least about 500 lbs. per square inch an aqueous sodium silicate liquid dispersion having a sodium silicate content of about 45% to 80% by weight, and substantially instantaneously flashing off water therefrom by forcing such heated liquid under pressure into an expansion zone of a lower pressure of at least about 500 lbs. per square inch, and at ambient temperature and in the absence of a moving column of air while simultaneously allowing rapid cooling of the particles; (B) a chelating agent for calcium and magnesium ions to soften water; and (C) a surfactant to enhance loosening of soil from fabrics; the proportion of said sodium silicate being in a major amount of at least about 50% by weight of said components, and the proportions of chelating agent and surfactant being in effective minor amounts.

2. The composition of claim 1 in which the amorphous sodium silicate particle size is about 5 to 150 mesh.

3. The composition of claim 2 wherein the particle size is about 10 to 20 mesh, and the bulk density about 15 to 21 lbs. per cubic foot.

References Cited

UNITED STATES PATENTS

| 3,450,494 | 6/1969 | Gaiser | 252—133 X |
| 3,400,176 | 9/1968 | Quimby | 252—89 X |
| 3,159,581 | 12/1964 | Diehl | 252—152 |
| 3,001,945 | 9/1961 | Drew et al. | 252—152 |

OTHER REFERENCES

"Amino Acid Chelating Agents in Detergent Applications," by Robert R. Pollard in Soap & Chemical Specialties, September 1966, pp. 58–62 and 130–135.

"Detergent Phosphorus Effect on Algae" by Thomas E. McLoney in Journal of the Water Pollution Control Federation, vol. 38, No. 1, pp. 38–45, January 1966.

Surface Active Agents, vol. I, by A. M. Schwartz et al., 1949, p. 380.

Surface Active Agents & Detergents, vol. II, A. M. Schwartz et al., 1958, pp. 296–297.

LEON D. ROSDOL, Primary Examiner

D. L. ALBRECHT, Assistant Examiner

U.S. Cl. X.R.

252—527, 539, 546